W. M. FULTON.
HUMIDIFYING DEVICE IN COMBINATION WITH RADIATOR CASINGS.
APPLICATION FILED JULY 24, 1916.
1,305,532.
Patented June 3, 1919.
2 SHEETS—SHEET 1.
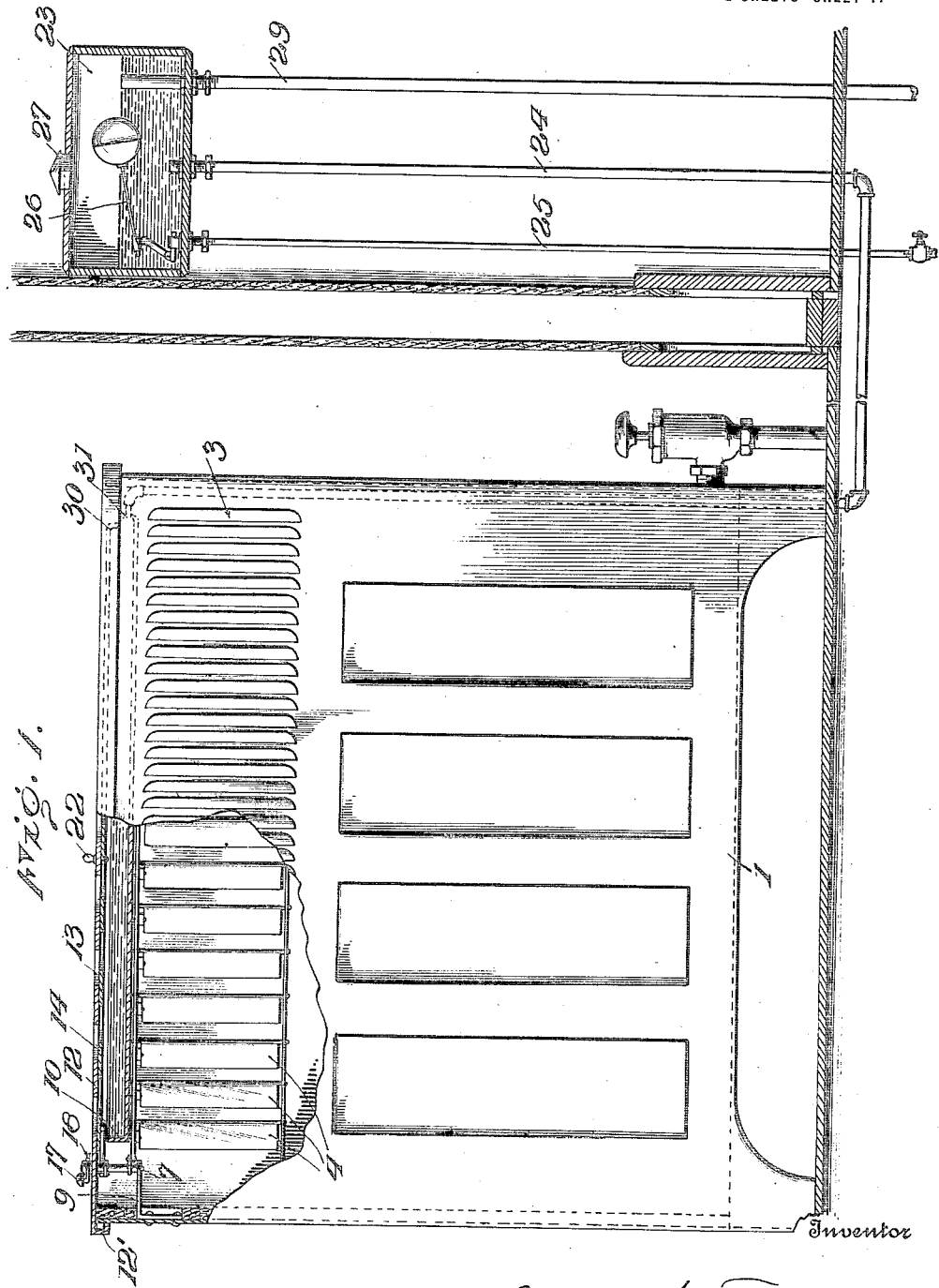

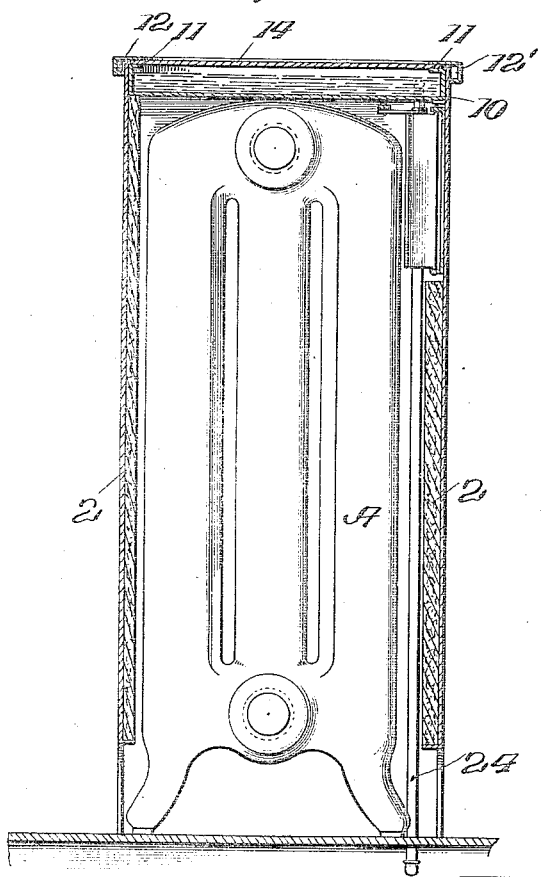
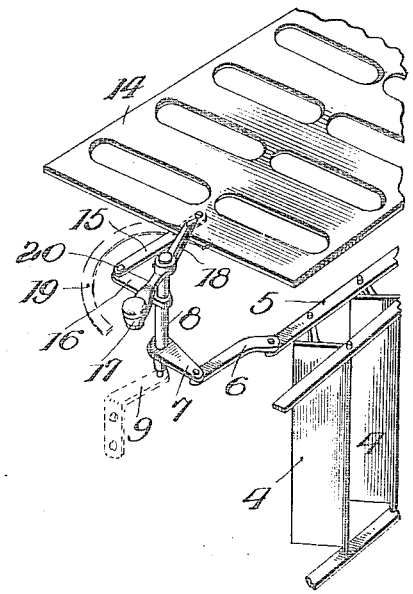
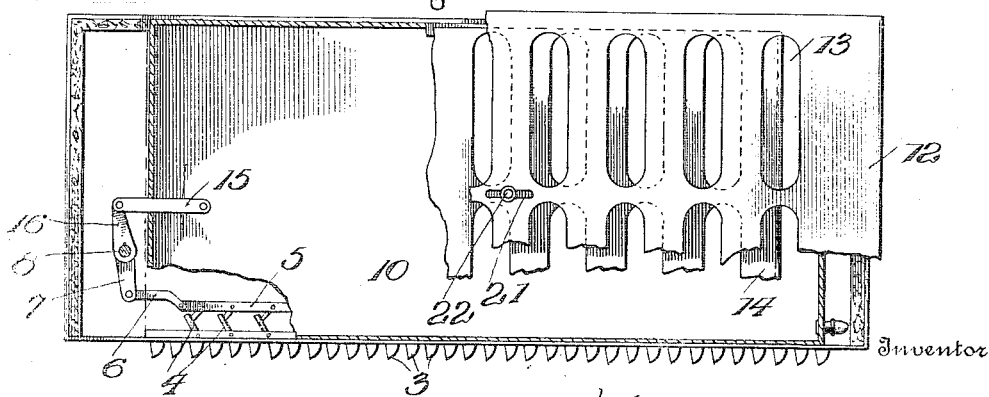

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

HUMIDIFYING DEVICE IN COMBINATION WITH RADIATOR-CASINGS.

1,305,532.  Specification of Letters Patent.  Patented June 3, 1919.

Application filed July 24, 1916. Serial No. 110,957.

*To all whom it may concern:*

Be it known that I, WESTON M. FULTON, a citizen of United States of America, and a resident of Knoxville, Tennessee, have invented a new and useful Improvement in Humidifying Devices in Combination with Radiator-Casings, which invention is fully set forth in the following specification.

This invention relates to a device for controlling, in connection with a heating system, the supply of water-vapor to the air in a room, compartment or other space so as to maintain a desired relative humidity. More particularly, it relates to the provision, in combination with a radiator casing and its air-controlling damper, of means for adjustably controlling the supply of water-vapor either in proportion to the amount of heat being supplied or, when circumstances demand, independently thereof.

It is an object of this invention to provide a humidifying device, in combination with source of heat such as a radiator in a jacket or casing, which will supply a proper amount of vapor, and to provide a simple and efficient means for controlling such supply either in conjunction with or independently of the means usually provided for controlling the escape of heated air from the jacket or casing or other heat-supplying means.

A further object of this invention is to provide a radiator casing with means for supplying water-vapor so disposed as to insure a proper amount of evaporation, and in conjunction therewith efficient means for controlling such evaporation. A further object of the invention is to provide means of the type above characterized which can be manufactured economically, which is unobjectionable in appearance, and which will operate with maximum efficiency.

Stated generally, the invention comprises, in conjunction with means for controlling the escape of heated air, as, where a casing is provided for inclosing a radiator, with means for controlling the escape of heated air therefrom, a vaporizing pan preferably disposed in the top of such casing and provided with means for controlling the escape of water-vapor therefrom. A common controlling means is preferably provided for the aforesaid means for varying the escape of heated air and water-vapor, such controlling means being shown as disconnectible from one of such means, to the end that said means for varying the escape of heated air and water vapor may be operated independently.

The invention is capable of receiving a variety of mechanical expressions. While, for the purpose of illustration, one embodiment of the invention has been shown in detail on the accompanying drawings and described with considerable particularity, it is to be expressly understood that such embodiment has been selected for purposes of illustration only, and is not to be construed as a definition of the limits of the invention, reference being had to the appended claims for such purpose.

Referring to the drawings, wherein the same characters designate corresponding parts in the several figures, Figure 1 is an elevation of a radiator casing embodying the invention, partly broken away at one corner to show the air and vapor-controlling dampers, and also illustrating in vertical section the means for supplying water automatically to the vaporizing pan;

Fig. 2 is a transverse vertical section of the radiator casing;

Fig. 3 is a top view of the casing, parts being broken away to show other parts thereunder;

Fig. 4 is a fragmentary perspective of the dampers and their controlling means separated, for convenience of illustration, from the radiator casing.

1 is a casing for a radiator A of any preferred type, such as steam or hot water, and is preferably constructed of sheet metal, the walls thereof being shown lagged or insulated, as illustrated at 2, with any suitable material for preventing the escape and loss of heat by conduction. Located adjacent the top of the front wall of this casing in the form shown is a series of louvers 3 or a grille of any desired form or pattern to permit the free egress of heated air from the interior of the casing. Back of the louvers or grille 3 is disposed means for controlling the escape of heated air from the casing, such means being shown as taking the form of a damper or dampers composed of a plurality of shutter-like members 4. In the form illustrated these shutter-like members 4 are pivotally connected to a link or links 5 whereby they may be actuated in unison, and the link 5 is in turn connected by means of link 6 with a crank-arm 7 projecting from a vertical stub-shaft 8 having bearings in the top of the casing and in the bracket 9.

Above the radiator and preferably attached to the walls of the casing is a shallow vaporizing pan 10. While a shallow pan-like structure has been shown, it is to be expressly understood that the term "vaporizing pan" is used generically to designate any or all suitable containers for water, whether pan-shaped or not. Preferably the vaporizing pan 10 extends from the front to the rear wall of the radiator casing, and it also preferably extends throughout the major portion of the length of such casing. The side walls of the pan 10 are shown as flanged inward to provide the lips 11 for a purpose that will hereinafter appear.

Means are provided for controlling the escape of water-vapor from the pan, such means preferably taking the form of a damper device. In the form shown, the top of the casing is provided with a cover 12 which may conveniently be provided with flanged edges to embrace the upper portion of the casing, as illustrated at 12'. This cover is provided with a plurality of apertures 13 of any desired configuration, the embodiment shown comprising two series of oblong apertures separated by closed portions slightly wider than the apertures. Supported on the inwardly directed lips 11, and sliding between such lips and the cover 12, is a damper plate 14 preferably made of sheet metal and provided with apertures conforming in position and shape with and approximately of the same size as apertures 13. The spaces between the apertures in the damper plate 14 being slightly wider than the apertures, it will be perceived that the closed portions of the damper plate may completely obstruct the apertures 13 in the cover.

Pivotally connected to the sliding damper plate 14 in the form shown is a link 15 which, in turn, is pivotally connected to a crank-arm 16 extending from the aforesaid shaft 8. Any suitable type of actuating means, either manual or automatic, may be provided for the shaft 8. In the embodiment illustrated a manual means has been shown, but it is to be expressly understood that the invention is equally applicable where a thermostatic control, for example, is desired. Above the top of the casing the shaft 8 is provided with manual manipulating means, as a handle member 17, which preferably is also extended to provide a pointer 18 which may coöperate with a dial member 19 to indicate the amount of opening of the damper member or members.

In order that the means for controlling the escape of water-vapor may be manipulated independently of the means for controlling the escape of heated air, the common controlling means for the heat-controlling and vapor-controlling dampers, above described, is made disconnectible from one of such dampers, preferably the vapor-controlling damper. This may be done conveniently by providing a readily removable pin 20 as the pivotal connection between link 15 and crank-arm 16. In order that the damper plate 14 may be adjusted when disconnected from the crank-arm 16, it is shown as provided with a projecting pin extending through a slot 21 in the cover and carrying a knob 22.

Means are preferably provided for automatically supplying the vaporizing pan with water. To this end a tank 23 may be provided for supplying water to vaporizing pans of all radiators at approximately the same level, such tank being disposed at any convenient location. The tank 23 supplies each pan with water through conduit 24 which leads from the bottom of the tank through any suitable form of connection and, passing beneath the floor, rises in such a position as to be concealed within the radiator casing, where it is connected by any suitable form of elbow with the vaporizing pan 10. For supplying water to the tank, pipe 25 leads thereinto from any available source of supply, and admission of water is controlled by a float-valve, generally indicated at 26. In order that pressure may not back up within the tank so as to cause overflow at the vaporizing pan, said tank is provided with a vent and cap-piece 27. Also, to provide an escape for the water in case the float-valve 26 fails to operate, an overflow pipe 29 is provided with its upper end below the level of the top of the vaporizing pan.

To provide for a minimum escape of water-vapor when the vapor-controlling damper is closed, the plate 14 is shown as provided with downwardly flanged ends 30 which coact with the edges 31 of the end walls of the pan to completely close the pan when the damper is in position to close the apertures 13.

If desired, the pan 10 may be positioned within the casing a short distance below the top thereof so that the heated air rising convectionally may pass over the end of the pan, and, before escaping through the apertures 13, absorb water-vapor.

In operation, the casing 1 is disposed so as to surround the radiator A, and vaporizing pan 10 is connected with the supply tank 23. Water will flow through the conduit 24 into the pan until the level therein is equal to a predetermined level in the tank, at which point the float-valve operates to cut off the further supply of water to the tank. Air enters the casing adjacent the bottom thereof, and, being heated by the radiator, rises convectionally and may escape through the louvers or grille 3 in the front of the casing, provided the damper be open. The hot air in rising impinges squarely on the bottom of the vaporizing pan 10 approximately normal thereto, whereby a maximum amount of heat may be absorbed by the water in such pan to cause evaporation therein. Assuming that the means for controlling the escape of heated air is partly open, as illustrated for example in Fig. 3, the amount of heated air escaping is controlled by the extent to which the damper members 4 are open. As damper plate 14 is connected to the manipulating means for the air-controlling damper, the vapor-controlling damper is open to an extent proportionate to that of the air-controlling damper. If it be desired to decrease the amount of hot air escaping, handle member 17 is rotated clockwise to swing damper members 4 toward closed position, such movement of the handle member 17 causing a proportionate displacement of damper plate 14 to proportionately close apertures 13, and therefore proportionately reduce the escape of water-vapor. An increased opening of the damper controlling the escape of hot air will also similarly increase the degree of opening of the apertures 13. The actuating means extending from the stub shaft 8 to the two aforesaid dampers are so proportioned that for each increment of opening of the damper controlling the escape of hot air, the damper controlling the escape of water-vapor is opened by an increment sufficient under normal conditions to supply the requisite water-vapor to maintain the desired relative humidity. If, as may be the case in damp weather, it be desired to open the air-controlling damper without permitting the escape of water-vapor, damper plate 14 may be disconnected at 20 from crank-arm 16 and the vaporizing pan left closed. Likewise, in warm dry weather, after disconnecting damper plate 14 from crank-arm 16, the vapor-controlling damper may be opened while the air-controlling damper is left shut. As the water is gradually evaporated from the pan, further water is supplied from the tank 23, and as the level of the water sinks in the tank, the float-valve opens to admit more water. In case the float-valve fails to close, the water escapes through the overflow pipe 29 and not overflow the vaporizing pan.

The dial 19 may desirably be graduated to show relative increments of heat and moisture, though obviously, if desirable, the graduation may indicate the amount of damper opening.

While in the embodiment illustrated a manual control of the two dampers for respectively regulating the escape of hot air and vapor has been illustrated, it is to be expressly understood that the invention is not restricted in application to any particular type of control, the nature of the invention being such as to render it readily adaptable to any preferred system, whether manual or automatic.

While the embodiment shown has been described with considerable particularity, it is to be understood that the invention is capable of receiving a variety of expressions, some of which will readily suggest themselves to those skilled in the art, and the above specific description is not to be taken as defining the limits of the invention, reference being had to the appended claims for that purpose.

What is claimed is:

1. In combination with a source of heat, means for controlling the flow of heated air therefrom, a vaporizing pan, and means coacting with said first-named means for proportioning the escape of vapor from said pan to the flow of heated air.

2. In combination with a source of heat, a damper for varying the quantity of heated air escaping therefrom, a vaporizing pan, a damper for varying the quantity of vapor escaping from said pan, and a common controlling means for said dampers.

3. A radiator casing having an air-outlet provided with an air-controlling damper, a vaporizing pan, and a vapor outlet provided with a vapor-controlling damper.

4. A radiator casing having an air-controlling damper, a vaporizing pan, a vapor-controlling damper, and a common controlling means for said dampers.

5. A radiator casing provided with means for controlling the flow of heated air therefrom, a vaporizing pan, and means coacting with said first-named means for proportioning the escape of vapor from said pan to the flow of heated air.

6. A radiator casing provided with adjustable means for controlling the escape of heated air therefrom, a vaporizing pan, adjustable means for controlling the escape of vapor from said pan, and a common actuating means for both said adjustable means.

7. A radiator casing having a lateral air-outlet provided with an air-controlling damper, and a vaporizing pan immediately above said air-outlet whereby the upwardly rising heated air impinges directly on said pan before passing through said air-outlet.

8. A radiator casing having a lateral air-outlet provided with an air-controlling damper, a vaporizing pan above said air-outlet whereby the upwardly rising heated air impinges directly on said pan before escaping through said air-outlet, and means for controlling the escape of vapor from said pan.

9. A radiator casing having a lateral air-outlet provided with an air-controlling damper, a vaporizing pan above said air-outlet, a damper for controlling the escape of vapor from said pan, and a common controlling means for said dampers.

10. In combination, a radiator casing provided with an air-controlling damper, a vaporizing pan, a vapor-controlling damper for said pan, a common controlling means for said dampers, and means whereby said dampers may be operated independently.

11. In combination, a radiator casing provided with an air-controlling damper, a vaporizing pan, a vapor-controlling damper for said pan, and a common controlling means for said dampers disconnectible from one of said dampers.

12. A radiator casing having an air-controlling damper, a vaporizing pan, and means whereby evaporation from said pan is substantially stopped when said air-controlling damper is closed.

13. A radiator casing having an air-controlling damper, a vaporizing pan, means for closing said pan to substantially stop further evaporation therefrom, and a common controlling means for said damper and said last-named means.

14. In combination, a radiator casing having a lateral opening provided with an air-controlling damper and a top opening provided with a vapor-controlling damper, and a shallow vaporizing pan occupying the major portion of the top of said casing.

15. In combination, a radiator casing having an air-controlling damper and provided with openings in the top wall thereof, a vaporizing pan in the top of said casing, and a plate provided with openings and slidable on the top of said pan to constitute with the openings in the top wall of said casing a damper for controlling the escape of vapor.

16. In combination, a radiator casing having a lateral air-outlet opening adjacent the top thereof, a vaporizing pan occupying the major portion of the top of said casing with its bottom so positioned that the air flowing to said lateral opening will impinge directly thereon and be deflected thereby, and a damper for controlling the escape of vapor from said pan.

17. In combination, a radiator casing having a lateral opening provided with an air-controlling damper and a top opening provided with a vapor-controlling damper, a vaporizing pan occupying the major portion of the top of said casing, and a common controlling means for said dampers.

In testimony whereof I have signed this specification.

WESTON M. FULTON.